(12) United States Patent
Zhu et al.

(10) Patent No.: US 11,560,926 B2
(45) Date of Patent: Jan. 24, 2023

(54) POWER TRANSMISSION SHAFT

(71) Applicant: HITACHI AUTOMOTIVE SYSTEMS, LTD., Hitachinaka (JP)

(72) Inventors: Xiaojin Zhu, Atsugi (JP); Yasutomo Mabe, Akiruno (JP); Kenichiro Ishikura, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 422 days.

(21) Appl. No.: 16/638,049

(22) PCT Filed: Aug. 28, 2018

(86) PCT No.: PCT/JP2018/031645
§ 371 (c)(1),
(2) Date: Feb. 10, 2020

(87) PCT Pub. No.: WO2019/058886
PCT Pub. Date: Mar. 28, 2019

(65) Prior Publication Data
US 2020/0217371 A1 Jul. 9, 2020

(30) Foreign Application Priority Data
Sep. 20, 2017 (JP) .............................. JP2017-179775

(51) Int. Cl.
*F16D 1/116* (2006.01)
*F16D 3/224* (2011.01)
(Continued)

(52) U.S. Cl.
CPC .............. *F16D 1/116* (2013.01); *F16D 3/224* (2013.01); *F16D 2001/103* (2013.01);
(Continued)

(58) Field of Classification Search
CPC ...... F16B 21/18; F16B 21/183; F16B 21/186; F16D 3/223; F16D 3/224;
(Continued)

(56) References Cited

U.S. PATENT DOCUMENTS 4,077,232 A * 3/1978 Grosseau .............. F16B 21/183
464/169
4,261,668 A * 4/1981 Rigal .................... F16B 21/183
403/359.5

(Continued)

FOREIGN PATENT DOCUMENTS

FR 2674299 A1 * 9/1992 .............. F16D 1/116
JP 2000-104810 A 4/2000
(Continued)

OTHER PUBLICATIONS

International Search Report with English translation issued in corresponding application No. PCT/JP2018/031645 dated Dec. 4, 2018.

(Continued)

*Primary Examiner* — Josh Skroupa
(74) *Attorney, Agent, or Firm* — Foley & Lardner LLP

(57) ABSTRACT

A power transmission shaft includes: a bearing including a cylindrical portion, an internal spline portion, and an internal spline side annular groove including a bottom surface, and a first side wall and a second side wall, the first side wall which includes a first inclination surface inclined with respect to the rotation axis of the shaft portion, and on which the circlip is abutted in a state where a radius of the circlip is decreased within the internal spline side annular groove, and the second side wall on which the circlip is abutted in the state where the radius of the circlip is decreased within the internal spline side annular groove.

11 Claims, 9 Drawing Sheets

(51) Int. Cl.
*F16D 1/10* (2006.01)
*F16D 3/223* (2011.01)

(52) U.S. Cl.
CPC .............. *F16D 2003/22313* (2013.01); *F16D 2003/22326* (2013.01); *Y10T 403/7033* (2015.01); *Y10T 403/7035* (2015.01)

(58) Field of Classification Search
CPC ..... F16D 2001/103; F16D 2003/22313; F16D 2003/22323; F16D 2003/22326; Y10S 464/904–906; Y10T 403/7033; Y10T 403/7035
USPC ...... 464/139–146, 182, 904–906; 403/359.5, 403/359.6
See application file for complete search history.

(56) References Cited

U.S. PATENT DOCUMENTS

| | | | | |
|---|---|---|---|---|
| 4,351,450 A | * | 9/1982 | Summerfield | ........ F16B 21/183 |
| | | | | 220/319 |
| 5,499,884 A | * | 3/1996 | Kuhnhold | ............... F16D 1/116 |
| | | | | 403/359.5 |
| 5,643,092 A | * | 7/1997 | Girguis | ................... F16D 1/116 |
| | | | | 403/359.5 |
| 6,263,779 B1 | * | 7/2001 | Oliver | ................... F16F 9/3242 |
| | | | | 92/128 |
| 6,561,720 B2 | * | 5/2003 | Wirth | .................... F16B 21/183 |
| | | | | 403/368 |
| 7,481,711 B2 | * | 1/2009 | Fukumura | ............... F16D 1/116 |
| | | | | 403/359.5 |
| 8,864,590 B2 | | 10/2014 | Sugiyama | |
| 8,864,591 B2 | * | 10/2014 | Sugiyama | ............... F16D 1/116 |
| | | | | 403/359.5 |
| 2006/0211505 A1 | | 9/2006 | Fukumura | |

FOREIGN PATENT DOCUMENTS

| | | | |
|---|---|---|---|
| JP | 2004-301137 A | 10/2004 | |
| JP | 2006-258254 A | 9/2006 | |
| JP | 2007-092932 A | 4/2007 | |
| JP | 2011-163410 A | 8/2011 | |
| JP | 5872341 B2 | 3/2016 | |
| WO | WO-2006080132 A1 * | 8/2006 | ............. F16D 3/223 |

OTHER PUBLICATIONS

Written Opinion with English translation issued in corresponding application No. PCT/JP2018/031645 dated Dec. 4, 2018.

* cited by examiner

1

POWER TRANSMISSION SHAFT

TECHNICAL FIELD

This invention relates to a power transmission shaft.

BACKGROUND ART

There has been known a conventional power transmission shaft described in a patent document 1 described below, and so on.

This power transmission shaft is a propeller shaft applied to a vehicle. The power transmission shaft includes an axial one end side connected though a constant velocity joint to a first shaft on a driving source side; and a second end side connected though a constant velocity joint to a second shaft on a driven wheel side. Circlips mounted on outer circumference sides of the first and second shafts are retained in internal spline side annular grooves formed on the inner circumference side of the constant velocity joints (inner wheel members), so that the first shaft and the second shaft are connected to the constant velocity joints.

PRIOR ART DOCUMENT

Patent Document

Patent Document 1: Japanese Patent No. 5872341

SUMMARY OF THE INVENTION

Problems which the Invention is Intended to Solve

However, in the propeller shaft which is the conventional power transmission shaft, the circlip are loosely mounted in the internal spline side annular groove, so that the circlip can be moved within the internal spline side annular groove. Accordingly, the circlips are repeatedly moved within the internal spline side annular grooves by the vibration of the engine which is inputted from the first shaft side, and so on. With this, the circlips are contacted against the inner surfaces of the internal spline side annular grooves. Consequently, the internal spline side annular grooves are worn away. This may cause various problems that the propeller shaft cannot detached from the vehicle, and so on.

It is, therefore, an object of the present invention to provide a power transmission shaft devised to solve the above-described problems, and to suppress the abrasion of the internal spline side annular groove by the sliding movement of the circlip.

Means for Solving the Problem

In one aspect according to the present invention, an internal spline side annular groove includes a first side wall, a second side wall, and a bottom surface. The first side wall includes a first inclination surface in which a radius of the first side wall is gradually increased toward the second side wall side.

Benefit of the Invention

By the present invention, it is possible to suppress the abrasion of the internal spline side annular groove by the sliding movement of the circlip.

DESCRIPTION OF EMBODIMENTS

Hereinafter, power transmission shafts according to embodiments of the present invention are explained in detail with reference to the drawings. Besides, in the below-described embodiments, the power transmission shafts are applied to a propeller shaft for a vehicle, similarly to the conventional devices.

First Embodiment

Figure 1:
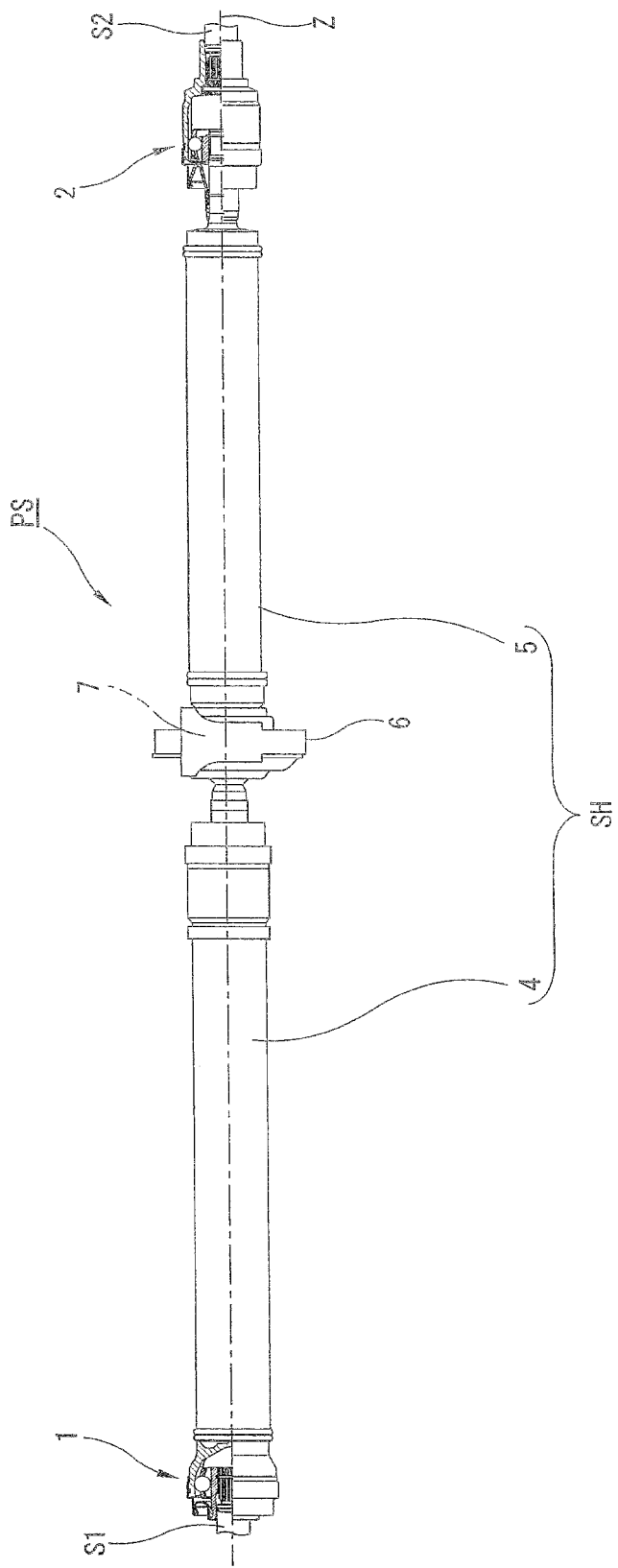
FIG. 1 is a side surface view showing a propeller shaft according to the present invention.

FIG. 1 to FIG. 5 show a power transmission shaft according to a first embodiment of the present invention. Besides, in the below-described embodiment, for explanation, a left side of FIG. 1 is defined as "front". A right side is defined as "rear". Moreover, an "axial direction" is defined by a direction along a rotation axis Z of FIG. 1. A "radial direction" is defined by a direction perpendicular to the rotation axis Z. A "circumferential direction" is defined by a direction around the rotation axis Z.

(Configuration of Propeller Shaft)

FIG. 1 is a side view showing an entire configuration of a propeller shaft PS according to the first embodiment of the present invention.

As shown in FIG. 1, the propeller shaft PS is provided between a first shaft S1 linked with a transmission (not shown), and a second shaft S2 linked with a differential (not shown). That is, this propeller shaft PS includes a driving shaft 4 connected to the first shaft S1 though a first constant velocity joint 1 which is a first joint member to rotate as a unit with the first shaft S1; and a driven shaft 5 connected through a second constant velocity joint 2 to rotate as a unit. The driving shaft 4 and the driven shaft 5 are connected with each other through a third constant velocity joint 3 to rotate as a unit with each other. Moreover, the propeller shaft PS is rotatably supported through a known bracket 6 provided near the third constant velocity joint 3, by a center bearing 7 suspended on a vehicle body (not shown). Besides, the driving shaft 4 and the driven shaft 5 constitute a shaft portion SH.

Figure 2:
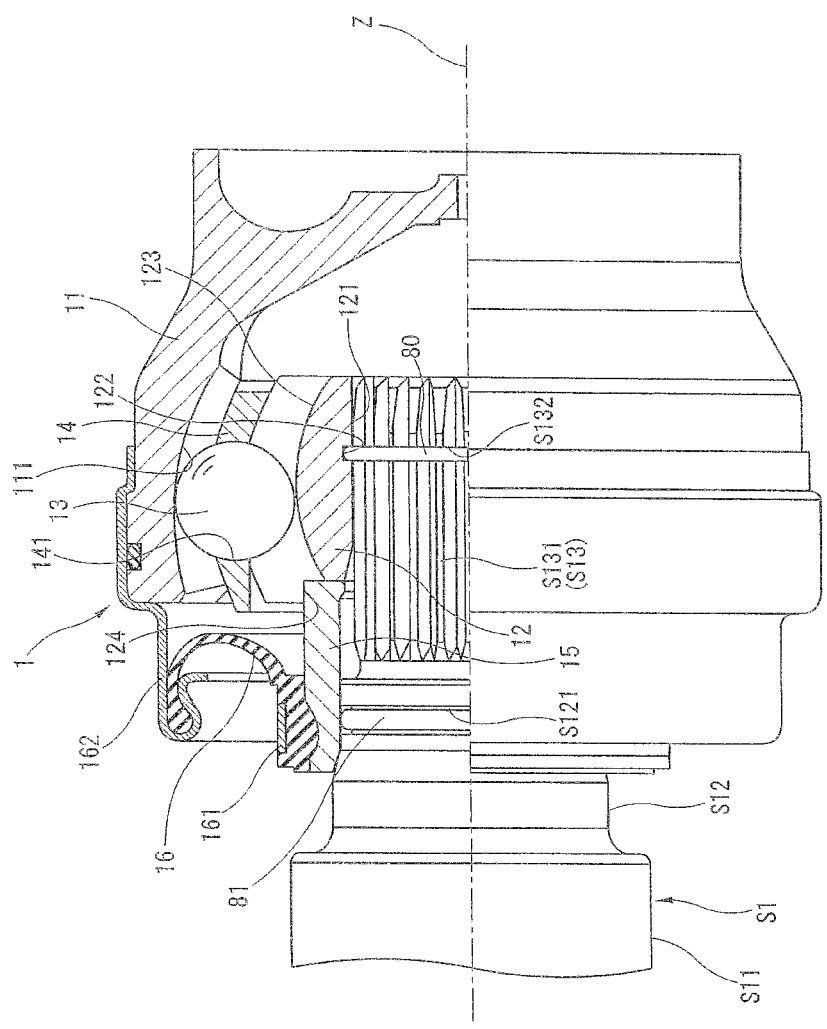
FIG. 2 is an enlarged view showing a first constant velocity joint shown in FIG. 1.
Figure 3:
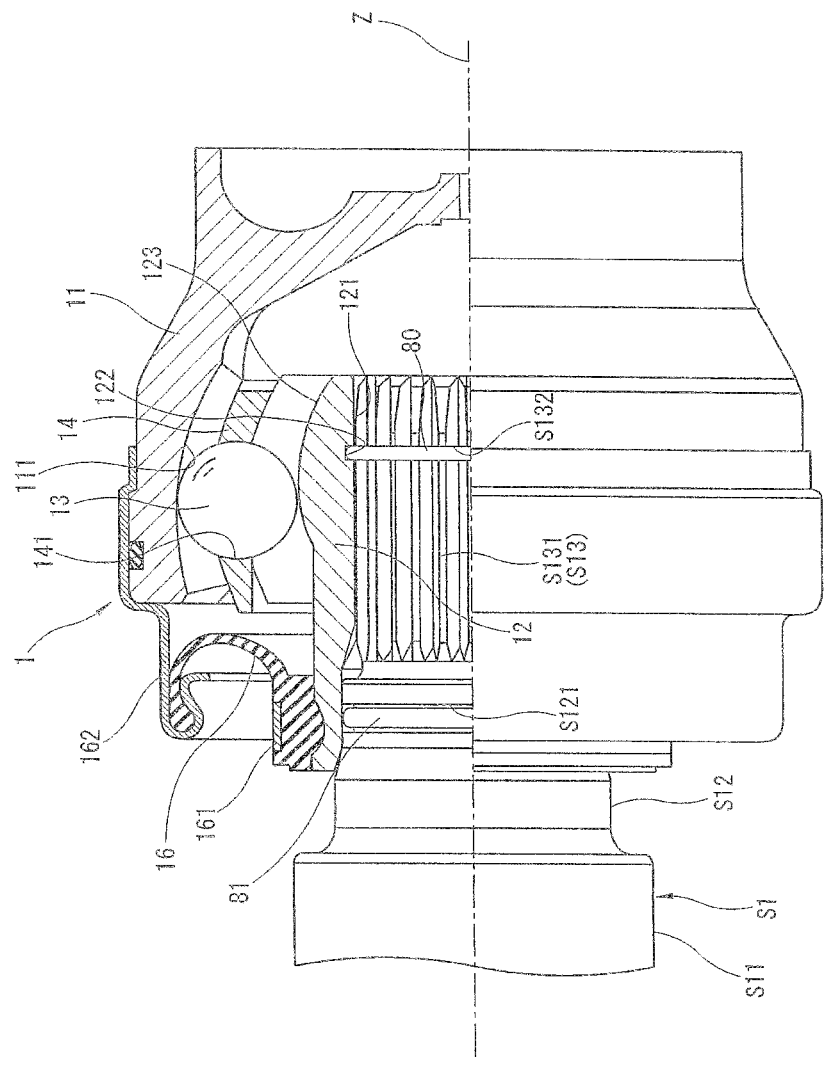
FIG. 3 is an enlarged view showing a variation of the first constant velocity joint shown in FIG. 2.

FIG. 2 is an enlarged view showing a main part of a portion near the first constant velocity joint 1. Moreover, FIG. 3 shows a variation of the first constant velocity joint shown in FIG. 2. Besides, in following explanations of an inner wheel member 12, for explanations, a first end portion side is defined by a left side of FIG. 2. A second end portion side is defined by a right side of FIG. 2.

As shown in FIG. 2, the first shaft S1 is made from iron series metal into a stepped shape. The first shaft S1 is inserted into the first constant velocity joint 1 from the first end portion side to the second end portion side. The first shaft S1 is fixed and retained within the first constant velocity joint 1. That is, the first shaft S1 includes a large diameter portion S11 linked with the transmission (not shown); a middle diameter portion S12 connected to a rear end portion of the large diameter portion S11; and a small diameter portion S13 connected to a rear end portion of the middle diameter portion S12. The large diameter portion S11, the middle diameter portion S12, and the small diameter portion S13 are integrally formed to constitute the first shaft S1.

The middle diameter portion S12 includes an annular seal groove S121 which is formed on an outer circumference surface to be continuous in a circumferential direction. A known first seal ring 81 is mounted in this seal groove S121. That is, this first seal ring 81 is elastically abutted on an inner circumference surface of a sleeve member 15 (described later). With this, it is possible to suppress foreign objects such as the dust and the water from entering from the outside into the first constant velocity joint 1.

The small diameter portion S13 includes an external spline portion S131 formed in the axial direction on an outer circumference side of the small diameter portion S13. Moreover, the small diameter portion S13 includes an external spline side annular groove S132 which has an annular shape, which is continuous in the circumferential direction, and which is formed at an axial position overlapped with the external spline portion S131. A known circlip 80 is mounted in this external spline side annular groove S132. The circlip 80 is arranged to retain the first shaft S1. That is, this circlip 80 is engaged in an internal spline side annular groove S132 (described later) so as to restrict the relative axial movement of the first shaft S1 with respect to the first constant velocity joint 1.

The first constant velocity joint 1 includes an outer wheel portion 11 connected to the driving shaft 4; an inner wheel member 12 disposed radially inside the outer wheel portion 11; a plurality of balls 13 which are rolling members rollingly disposed between the inner wheel member 12 and the outer wheel portion 11; and a holding device 14 arranged to hold the balls 13. Besides, in the first constant velocity joint 1, the inner wheel member 12 corresponds to a cylindrical portion in the present invention.

The outer wheel portion 11 extends from a front end portion of the driving shaft 4. The outer wheel portion 11 is formed into a cup shape opened on the front end side of the driving shaft 4. The outer wheel portion 11 includes a plurality of outer wheel side engagement grooves 111 which are formed in the axial direction on the inner circumference side of the outer wheel portion 11, and in which the balls 13 are engaged. That is, the rolling movements of the balls 13 within the outer wheel side engagement grooves 111 allow the relative movement of the outer wheel portion 11 and the inner wheel member 12 in the axial direction. The engagements of the balls 13 with the outer wheel side engagement grooves 111 restrict the relative movement of the outer wheel portion 11 and the inner wheel member 12 in the circumferential direction.

The inner wheel member 12 is formed into a substantially cylindrical shape. The inner wheel member 12 includes an internal spline portion 121 which is formed in the axial direction on the inner circumference side of the inner wheel member 12, and which is arranged to be engaged with the external spline portion S131 of the first shaft S1. Moreover, the inner wheel member 12 includes an internal spline side annular groove 122 which is formed on the inner circumference side of the inner wheel member 12 at an axial position overlapped with the internal spline portion 121, in which the circlip 80 mounted to the first shaft S1 is arranged to be retained, and which is continuous in the circumferential direction. Furthermore, the inner wheel member 12 includes a plurality of inner wheel side engagement grooves 123 which are formed on the outer circumference side of the inner wheel member 12 to confront the outer wheel side engagement grooves 111 of the outer wheel portion 11, which serve for the rolling movements and the engagements of the balls 13, and which are formed in the axial direction.

The balls 13 are received in a track portion formed by combining the outer wheel side engagement grooves 111 and the inner wheel side engagement grooves 123. Moreover, the balls 13 are engaged in a state where the relative rotations of the balls 13 with respect to the outer wheel side engagement grooves 111 and the inner wheel side engagement grooves 123 are restricted. With this, it is possible to transmit the torque between the outer wheel portion 11 and the inner wheel member 12 in a state where the constant velocity characteristics is maintained.

The holding device 14 has a substantially cylindrical shape. The holding device 14 includes window portions 141 which are formed at predetermined circumferential positions in the radial directions. A number of the window portions 141 is identical to a number of the balls 13. The balls 13 are received and held, respectively, within the window portions 141.

In this configuration, in the first constant velocity joint 1, when the rotation torque is inputted to the first shaft S1, this rotation torque is transmitted from the inner wheel member 12 arranged to rotate as a unit with the first shaft S1, through the balls 13 to the outer wheel portion 11. With this, the rotation torque inputted from the first shaft S1 is transmitted to the driving shaft 4 in a state where the constant velocity characteristics is maintained.

The inner wheel member 12 includes a sleeve insertion portion 124 which is formed at an opening end portion of the inner wheel member 12 on the first end portion side, and which has a stepped diameter increasing shape. A sleeve member 15 constituting a part of the first constant velocity joint 1 is inserted within the sleeve insertion portion 124. The sleeve member 15 has a substantially cylindrical shape. The sleeve member 15 is press-fit in the sleeve insertion portion 124 so as to rotate as a unit with the inner wheel member 12.

Moreover, a waterproof boot 16 is mounted between the outer wheel portion 11 and the inner wheel member 12 to extend between the outer wheel portion 11 and the inner wheel member 12. The waterproof boot 16 is arranged to protect the first constant velocity joint 1 from the water and the dust. This waterproof boot 16 includes an intermediate portion having a folded-back shape so as to be telescopic (expandable) in the axial direction. The waterproof boot 16 includes a front end portion bound and fixed through a known boot band 161 on an outer circumference surface of the sleeve member 15. The waterproof boot 16 includes a rear end portion fixed by the caulking through a mounting fitting 162 on an outer circumference surface of the outer wheel portion 11.

Besides, in this embodiment, the first constant velocity joint 1 has a configuration in which the inner wheel member 12 and the sleeve member 15 are different members. However, the present invention is not limited to this configuration. That is, as shown in FIG. 3 and so on, the inner wheel member 12 and the sleeve member 15 may be integrally constituted as the inner wheel member 12.

Figure 4:
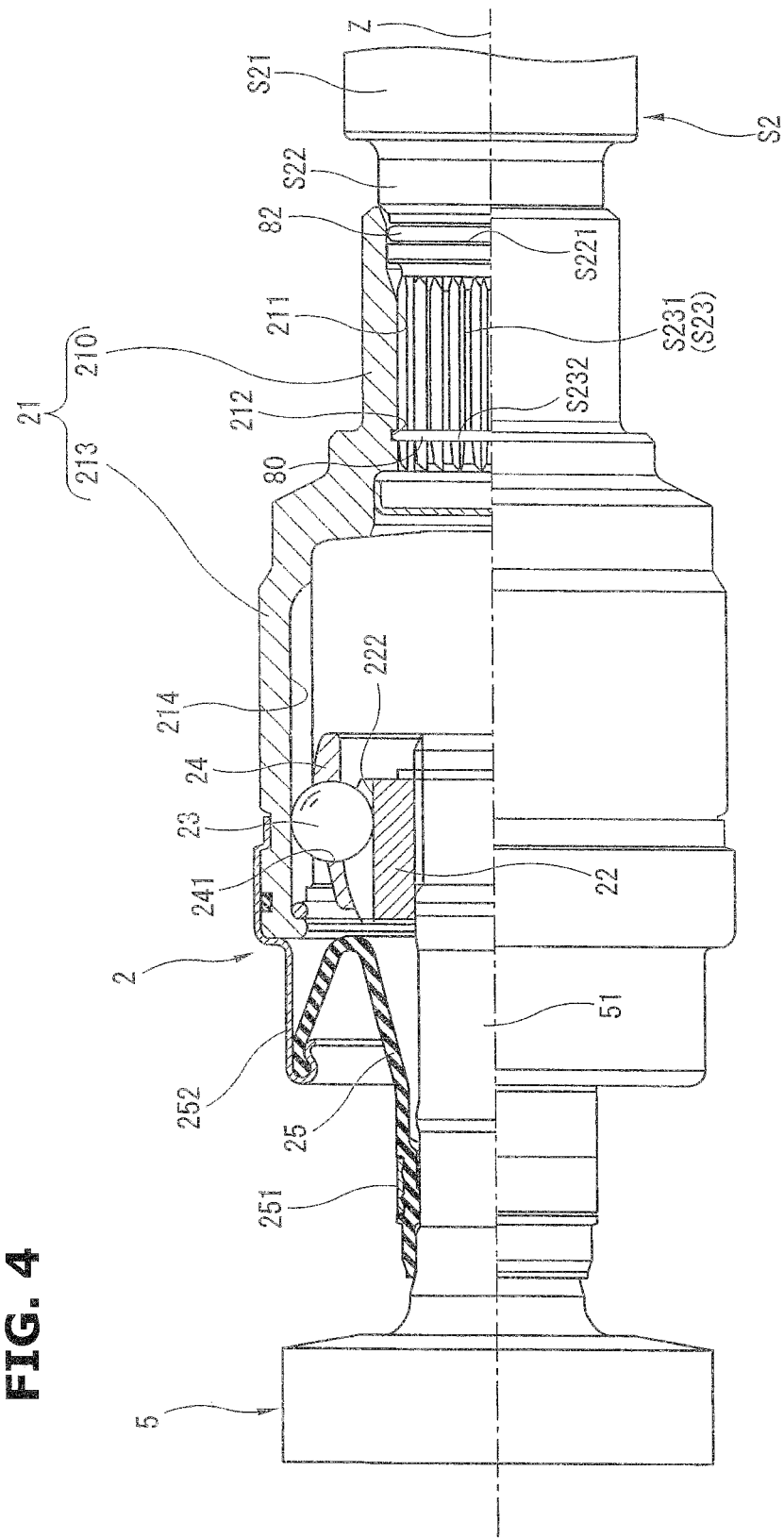
FIG. 4 is an enlarged view showing a second constant velocity joint shown in FIG. 1.

FIG. 4 is an enlarged view showing a main part of FIG. 1 by enlarging a portion near the second constant velocity joint 2. Besides, in following explanations of the inner wheel member 22, for explanations, a first end portion side is defined by a right side in FIG. 4. A second end side is defined by a left side in FIG. 4.

As shown in FIG. 4, the second shaft S2 is made from the iron series metal into a stepped shape. Similarly to the first shaft S1, the second shaft S2 is inserted into the second constant velocity joint 2 from the first end portion side to the second end portion side. The second shaft S2 is fixed and retained within the second constant velocity joint 2. That is, the second shaft S2 includes a large diameter portion S21 linked with the differential gear (the differential) (not shown); a middle diameter portion S22 connected to a front end portion of the large diameter portion S21; and a small diameter portion S23 connected to a front end portion of the middle diameter portion S22. The large diameter portion S21, the middle diameter portion S22, and the small diameter portion 23 are integrally formed to constitute the first shaft S2.

The middle diameter portion S22 includes an annular seal groove S221 which is formed on an outer circumference surface to be continuous in a circumferential direction. A known second seal ring 82 is mounted in this seal groove S221. That is, this second seal ring 82 is elastically abutted on an inner circumference surface of a small diameter portion 210 (described later). With this, it is possible to suppress foreign objects such as the dust and the water from entering from the outside into the second constant velocity joint 2.

The small diameter portion S23 includes an external spline portion S231 formed in the axial direction on an outer circumference side of the small diameter portion S23. Moreover, the small diameter portion S23 includes an external spline side annular groove S232 which has an annular shape, which is continuous in the circumferential direction, and which is formed at an axial position overlapped with the external spline portion S231. A known circlip 80 is mounted in this external spline side annular groove S232. The circlip 80 is arranged to retain the first shaft S2. That is, this circlip 80 is engaged in an internal spline side annular groove S232 (described later) so as to restrict the relative axial movement of the second shaft S2 with respect to the second constant velocity joint 2.

The second constant velocity joint 2 includes an inner wheel member 22 connected to the driven shaft 5; an outer wheel member 21 disposed radially outside the inner wheel member 22; a plurality of balls 23 which are rolling members rollingly disposed between the inner wheel member 22 and the outer wheel member 21; and a holding device 24 arranged to hold the balls 23. Besides, in the second constant velocity joint 2, the small diameter portion 210 (described later) corresponds to a cylindrical portion in the present invention.

The outer wheel member 21 has a substantially cylindrical shape. The outer wheel member 21 includes the small diameter portion 210 which is the cylindrical portion serving for the connection with the second shaft S2, and which is integrally formed on the rear end side to extend in the axial direction. Moreover, the outer wheel member 21 includes an internal spline portion 211 which is formed on an inner circumference side of the small diameter portion 210, and which is arranged to be engaged with the external spline portion S231 of the second shaft S2. Furthermore, the outer wheel member 21 includes an internal spline side annular groove 212 which is formed on the inner circumference side of the small diameter portion 210 at an axial position overlapped with the internal spline portion 211, in which the circlip 80 mounted to the second shaft S2 is arranged to be retained, and which is continuous in the circumferential direction.

The outer wheel member 21 includes a large diameter portion 213 which is formed at a front end portion of the outer wheel member 21, which has stepwisely increasing diameters with respect to the small diameter portion 210, and which is integrally formed coaxial with the small diameter portion 210. The outer wheel member 21 includes a plurality of outer wheel side engagement grooves 214 which are formed on the inner circumference side of the large diameter portion 213 linearly in the axial direction, and in which the balls 23 are engaged. That is, the rolling movements of the balls 23 within the outer wheel side engagement grooves 214 allow the relative movement of the outer wheel member 21 and the inner wheel member 22 in the axial direction. The engagements of the balls 13 with the outer wheel side engagement grooves 214 restrict the relative movement of the outer wheel member 21 and the inner wheel member 22 in the circumferential direction.

The inner wheel member 22 is formed into a substantially cylindrical shape. The inner wheel member 22 includes an internal spline portion 221 which is formed in the axial direction on the inner circumference side of the inner wheel member 22, and which is arranged to be engaged with an external spline portion 511 formed on an outer circumference side of a stub shaft 51 provided at the rear end portion of the driven shaft 5. On the other hand, the inner wheel member 22 includes a plurality of inner wheel side engagement grooves 222 which are formed on the outer circumference side of the inner wheel member 22 to confront the outer wheel side engagement grooves 214 of the outer wheel member 21, which serve for the rolling movements and the engagements of the balls 23, and which are formed in the axial direction.

The balls 23 are received in a track portion formed by combining the outer wheel side engagement grooves 214 and the inner wheel side engagement grooves 222. Moreover, the balls 23 are engaged in a state where the relative rotations of the balls 23 with respect to the outer wheel side engagement grooves 214 and the inner wheel side engagement grooves 222 are restricted. With this, it is possible to transmit the torque between the outer wheel member 21 and the inner wheel member 22 in a state where the constant velocity characteristics is maintained.

The holding device 24 has a substantially cylindrical shape. The holding device 24 includes window portions 241 which are formed at predetermined circumferential positions in the radial directions. A number of the window portions 241 is identical to a number of the balls 23. The balls 23 are received and held, respectively, within the window portions 241.

In this configuration, in the second constant velocity joint 2, when the rotation torque is inputted from the driven shaft 5 side to the inner wheel member 22, this rotation torque is transmitted from the inner wheel member 22 arranged to rotate as a unit with the driven shaft 5, through the balls 23 to the outer wheel member 21. With this, the rotation torque inputted from the driven shaft 5 side is transmitted to the second shaft S2 in a state where the constant velocity characteristics is maintained.

Moreover, a waterproof boot 25 is mounted between the outer wheel member 21 and the inner wheel member 22 to extend between the outer wheel portion 11 and the inner wheel member 12. The waterproof boot 16 is arranged to protect the second constant velocity joint 2 from the water and the dust. This waterproof boot 16 includes an intermediate portion having a folded-back shape so as to be telescopic (expandable) in the axial direction. The waterproof boot 16 includes a front end portion bound and fixed through a known boot band 251 on an outer circumference surface of the rear end portion of the driven shaft 5. The waterproof boot 16 includes a rear end portion fixed by the caulking through a mounting fitting 252 on an outer circumference surface of the front end portion of the outer wheel member 21.

Figure 5:
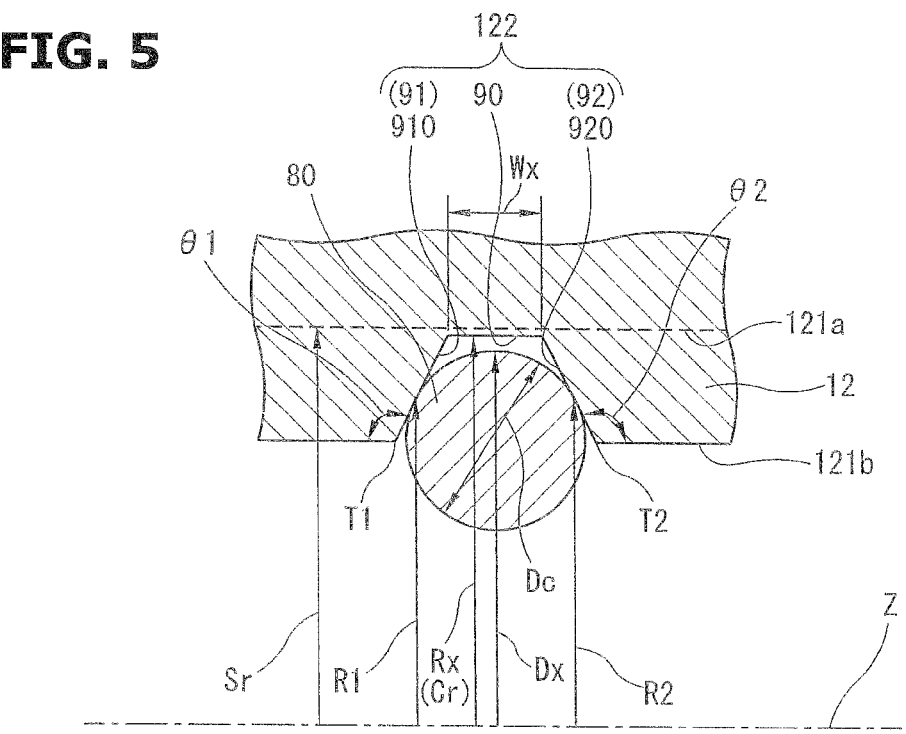
FIG. 5 is an enlarged view showing a main part of FIG. 2 in a first embodiment of the present invention.

FIG. 5 shows an enlarged view showing a main part of FIG. 1 by enlarging a portion near the internal spline side annular groove 122 of the first constant velocity joint 1. Besides, these internal spline side annular groove 122 and 212 have the identical structure. Accordingly, the only internal spline side annular groove 122 of the first constant velocity joint 1 is explained in FIG. 5. The explanation of the internal spline side annular groove 212 of the second constant velocity joint 2 is omitted. Moreover, in the explanations of FIG. 5, a first end portion side is defined by a left side of FIG. 5 which is an insertion side of the first shaft S1. A second end portion side is defined by a right side of FIG. 5.

As shown in FIG. 5, the circlip 80 has a known circlip having a vertical section which is a substantially circular shape. In the circlip 80, a region of a substantially half of a wire diameter Dc confronts the inside of the internal spline side annular groove 122, and is retained in the internal spline side annular groove 122. That is, the circlip 80 is inserted with the first shaft S1 into the internal spline portion 121 in a state where the circlip 80 is contracted radially inside a tooth bottom surface of the external spline portion S131 of the first shaft S1. The circlip 80 is restored to increase the diameter thereof when the circlip 80 reaches the internal spline side annular groove 122, and retained in this internal spline side annular groove 122.

In a vertical section (a section passing through a rotation axis Z as shown in FIG. 5), the internal spline side annular groove 122 includes a bottom surface 90; a first side wall 91 disposed on the first end portion side of the bottom surface 90; and a second side wall 92 disposed on the second end portion side of the bottom surface 90.

The bottom surface 90 is formed into a substantially flat shape which is parallel to a tooth bottom surface 121a of the internal spline portion 121 in the axial direction. The bottom surface 90 has an inside diameter Rx set to be greater than an outside diameter Dx of the circlip 80 so that the circlip 80 and the bottom surface 90 are not constantly abutted on each other. Moreover, the bottom surface 90 has an annular groove bottom surface radius Cr which is a shortest distance from the rotation axis Z, and which is set to be smaller than a spline tooth bottom surface radius Sr which is a shortest distance between the tooth bottom surface 121a of the internal spline portion 121, and the rotation axis Z.

The first side wall 91 includes a first inclination surface 910 which has a conical tapered shape inclined with respect to the rotation axis Z so that a radius R1 which is a shortest distance from the rotation axis Z is gradually increased toward the second end portion side. With this, basically, the circlip 80 is constantly abutted on the first side wall 91 (the first inclination surface 910) in a state where the circlip 80 is contracted (the outside diameter Dx is contracted).

The second side wall 92 includes a second inclination surface 920 which has a conical tapered shape inclined with respect to the rotation axis Z so that a radius R2 which is a shortest distance from the rotation axis Z is gradually increased toward the first end portion side. With this, basically, the circlip 80 is constantly abutted on the second side wall 92 (the second inclination surface 920) in a state where the circlip 80 is contracted (the outside diameter Dx is contracted).

In this case, in the embodiment, the first inclination surface 910 and the second inclination surface 920 have, respectively, a first inclination angle 81 and a second inclination angle 82 which correspond to inclination angles with respect to the rotation axis Z, which are identical to each other. That is, the first side wall 91 and the second side wall 92 are formed to be symmetry to sandwich the bottom surface 90 in the vertical section.

In this case, the first inclination angle 81 is an inferior angle of angles sandwiched by the first side wall 91 and an inner circumference surface of the inner wheel member 12 (a tooth tip surface (tooth crest) 121b of the internal spline portion 121) to have a first apex T1 which is a radial inner end portion of the first side wall 91 (an inner end portion of the first side wall 91 in the radial direction). Similarly, the second inclination angle 82 is an inferior angle of angles sandwiched by the second side wall 92 and the inner circumference surface of the inner wheel member 12 (the tooth tip surface (tooth crest) 121b of the internal spline portion 121) to have a second apex T2 which is a radial inner end portion of the second side wall 92.

In particular, the first inclination angle 81 is determined in accordance with a pulling-out load of the first shaft S1. That is, the first inclination angle 81 is an angle determined in accordance with a specification of the propeller shaft PS. On the other hand, the second inclination angle 82 is freely set independently of the specification of the propeller shaft PS.

Moreover, as described above, the circlip 80 is arranged to be abutted on the first side wall 91 and the second side wall 92 in the state where the circlip 80 is contracted. However, the configuration is not limited to this configuration. That is, for example, the first side wall 91 and the second side wall 92 may be arranged so that the circlip 80 is exactly abutted in a free state on the first side wall 91 and the second side wall 92, for example, by the machining error of the internal spline side annular groove 122 and so on.

Furthermore, in this embodiment, the first side wall 91 and the second side wall 92 have the inclination shapes. With this, an axial width We of radial inner end portions of the first side wall 91 and the second side wall 92 is set to be greater than the wire diameter Dc of the circlip 80. That is, the first inclination angle 81 and the second inclination angle 82 are set so that the axial width We of the radial inner end portions of the first side wall 91 and the second side wall 92 is greater than the wire diameter Dc of the circlip 80. With this, within the internal spline side annular groove 122, the circlip 80 is abutted on the portions of the first side wall 91 and the second side wall 92 which are other than the radial inner end portions of the first side wall 91 and the second side wall 92 (the intermediate portions of the first and second side walls 91 and 92).

Operations and Effects of this Embodiment

As described above, in the conventional propeller shaft, the circlip is loosely mounted in the internal spline side annular groove so that the circlip can be moved within the internal spline side annular groove. Accordingly, the circlip is repeatedly moved within the internal spline side annular groove due to the vibration of the engine which is inputted from the first shaft side, and so on. With this, the circlip is abutted on the inner surface of the internal spline side annular groove, so that the internal spline side annular groove is worn away. Consequently, this may cause various problems that the propeller shaft cannot be detached from the vehicle.

On the other hand, in the propeller shaft PS according to this embodiment, it is possible to obtain the following effects, and thereby to solve the problems of the conventional propeller shaft.

The propeller shaft PS is the power transmission shaft provided between the first shaft S1 provided on the driving source side of the vehicle, and the second shaft S2 provided on the driven wheel side. The propeller shaft PS includes a shaft portion SH provided between the first shaft S1 and the second shaft S2; and the first constant velocity joint 1 and the second constant velocity joint 2 each of which are a bearing including a cylindrical portion (the inner wheel member 12 and the small diameter portion 210), an internal spline portion 121, 211, and an internal spline side annular groove 122, 212, the cylindrical portion (the inner wheel member 12 and the small diameter portion 210) which is provided to the shaft portion SH, and which includes a first end portion and a second end portion that are both end portions in a direction of a rotation axis of the shaft portion, the internal spline portion 121, 211 which is formed on an inner circumference side of the cylindrical portion (the inner wheel member 12 and the small diameter portion 210), and which is arranged to be engaged with an external spline portion formed on an outer circumference side of one of the first shaft S1 and the second shaft S2 by inserting the one of the first shaft S1 and the second shaft S2 into the cylindrical portion (the inner wheel member 12 and the small diameter portion 210) from the first end portion side of the cylindrical portion toward the second end portion side of the cylindrical portion, the internal spline side annular groove 122, 212 which is formed on the inner circumference side of the cylindrical portion (the inner wheel member 12 and the small diameter portion 210), which holds a circlip 80 provided in an external spline side annular groove S132, S232 formed on the outer circumference side of one of the first shaft S1 and the second shaft S2 to restrict movement of the one of the first shaft S1 and the second shaft S2 with respect to the cylindrical portion (the inner wheel member 12 and the small diameter portion 210) in the direction of the rotation axis Z of the shaft portion SH, and which includes a bottom surface 90, and a first side wall 91 and a second side wall 92 which are a pair of side walls provided on both sides in the direction of the rotation axis Z of the shaft portion SH in a section passing through the rotation axis Z of the shaft portion SH, the first side wall 91 which is provided on the first end portion side of the bottom surface 90, which includes a first inclination surface 910 inclined with respect to the rotation axis Z of the shaft portion SH so that a radius R1 of the first side wall 91 which is a shortest distance from the rotation axis Z of the shaft portion SH is gradually increased from the first end portion side toward the second end portion side, and on which the circlip 80 is abutted in a state where a radius of the circlip 80 is decreased within the internal spline side annular groove 122, 212, and the second side wall 92 which is provided on the second end portion side of the bottom surface 90, and on which the circlip 80 is abutted in the state where the radius of the circlip 80 is decreased within the internal spline side annular groove 122, 212.

In this way, in this embodiment, the circlip 80 is arranged to be constantly abutted on the first side wall 91 and the second side wall 92. Accordingly, it is possible to suppress the wobble of the circlip 80 within the internal spline side annular grooves 122 and 212 in the axial direction and in the radial direction. Consequently, it is possible to suppress damage of the internal spline side annular grooves 122 and 212 due to the repeated load from the circlip 80 to the internal spline side annular grooves 122 and 212.

Moreover, in this embodiment, the circlip 80 is abutted on the first inclination surface 910.

In a case where the circlip 80 is abutted on the opening edges (the corner portions) of the internal spline side annular grooves 122 and 212, the corner portions are broken (worn out). With this, the interference (tightening margin) of the circlip 80 may be decreased so that the holding force of the circlip 80 may be decreased.

In this embodiment, the circlip 80 is abutted on the first side wall 91 which is the surface. Accordingly, it is possible to suppress the damage of the portion of the first side wall 91 on which the circlip 80 is abutted. Consequently, it is possible to suppress the reduction of the holding force of the circlip 80 in the internal spline side annular grooves 122 and 212.

Moreover, in this embodiment, the circlip 80 is abutted on the portion of the second side wall 92 which is other than the inner end portion (the corner portion) of the shaft portion SH in the radial direction of the rotation axis Z of the shaft portion SH.

In this way, in this embodiment, the circlip 80 is not abutted on the corner portion on the second end portion side. The circlip 80 is abutted on the second side wall 92 which is the surface. Accordingly, it is possible to suppress the damage of the second side wall 92.

Moreover, in this embodiment, the second side wall 92 includes the second inclination surface 920 inclined with respect to the rotation axis Z of the shaft portion SH so that the radius R2 of the second side wall 92 which is the shortest distance of the shaft portion SH from the rotation axis Z is gradually decreased from the first end portion side toward the second end portion side.

In this way, in this embodiment, the circlip 80 is abutted on the second inclination surface 920. Accordingly, it is possible to increase the abutment area of the circlip 80 on the second side wall 92, and thereby to suppress the damage of the second side wall 92. Consequently, it is possible to suppress the reduction of the holding force of the circlip 80 in the internal spline side annular grooves 122 and 212.

Moreover, in this embodiment, the circlip 80 is not abutted on the bottom surface 90.

In a case where the product in which the circlip 80 is abutted on the bottom surface 90, and the product in which the circlip 80 is not abutted on the bottom surface 90 are mixed due to the manufacturing error of the internal spline side annular grooves 122 and 212, and so on, it is difficult to manage (control) the holding force of the circlip 80. In particular, in the circlip 80 which is abutted on the bottom surface 90, the holding force of the circlip 80 may be deficient. On the other hand, in the circlip 80 which is not abutted on the bottom surface 90, the holding force of the circlip 80 may be excessive.

Accordingly, in any products, the sufficient clearance is ensured between the circlip 80 and the bottom surface 90 so that the circlip 80 is not abutted on the bottom surface 90. With this, it is possible to suppress the variation of the holding forces of the circlips 80.

Moreover, in this embodiment, the annular groove bottom surface radius Cr is defined by the shortest distance between the bottom surface 90 and the rotation axis Z of the shaft portion SH. The spline tooth bottom surface radius Sr is defined by the shortest distance between the tooth bottom surfaces 121a and 211a of the internal spline portions 121 and 211 and the rotation axis Z of the shaft portion SH. The internal spline side annular grooves 122 and 212 have shapes in which the annular groove bottom radius Cr is smaller than the tooth bottom surface radius Sr.

In the propeller shaft PS, after the internal spline side annular grooves 122 and 212 are formed, the internal spline portions 121 and 211 are formed by the broaching. Accordingly, in a case where the spline tooth bottom surface radius Sr is greater than the annular groove bottom surface radius Cr, the tip end of the broach is interfered with the internal spline side annular grooves 122 and 212. Consequently, the processing characteristics of the broaching is deteriorated, and the life of the broach is deteriorated.

Accordingly, in this embodiment, the annular groove bottom surface radius Cr is set to be smaller than the spline tooth bottom surface radius Sr. With this, at the processing of the internal spline portions 121 and 211, the tip end of the broach is not interfered with the internal spline side annular grooves 122 and 212. That is, at the processing of the internal spline portions 121 and 211, the broaching does not become intermittent cutting so that the processing characteristics of the broaching becomes good. Moreover, since the broaching does not become the intermittent cutting, it is possible to decrease the abrasion of the broach, and to improve the life of the broach.

Second Embodiment

Figure 6:
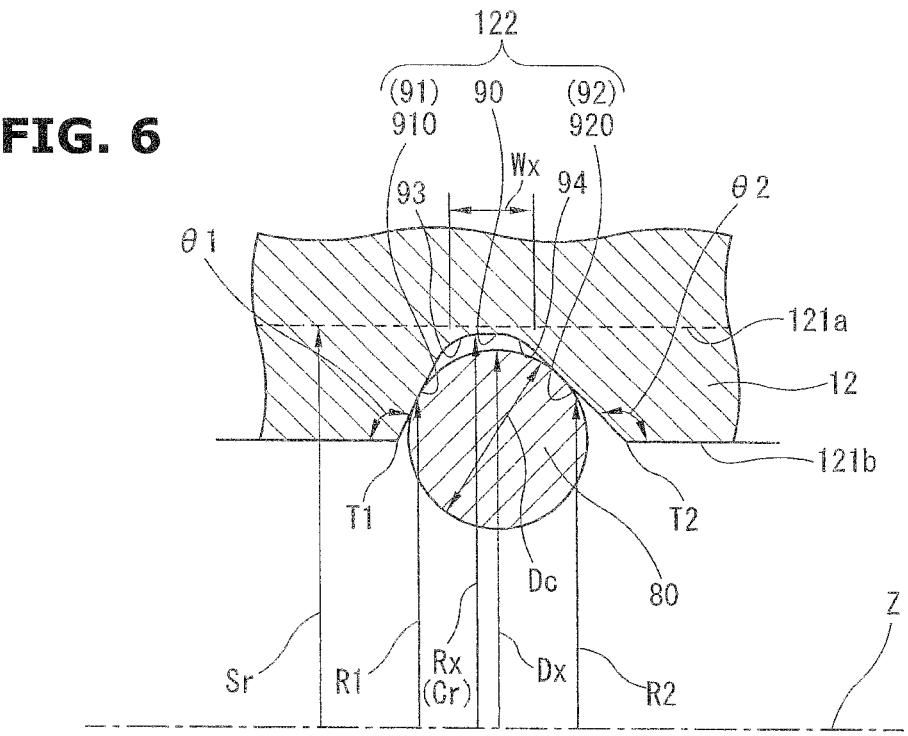
FIG. 6 is an enlarged view showing a main part of FIG. 2 in a second embodiment of the present invention.

FIG. 6 shows a propeller shaft according to a second embodiment of the present invention. In this second embodiment, the shapes of the internal spline side annular grooves 122 and 212 according to the first embodiment are varied. Besides, the basic structures are identical to those of the first embodiment, except for the above-described variations. Accordingly, the structures identical to those of the first embodiment has the same symbols to omit the explanations thereof (the same is applied in below-described embodiments).

FIG. 6 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 6 which is the insertion side of the first shaft S1. A second end portion side is defined by a right side of FIG. 6.

In this embodiment, in the internal spline side annular groove 122, the first inclination angle 61 is set to be greater than the second inclination angle 82, as shown in FIG. 6. That is, the radial inner end portion of the second side wall 92 is set to be apart from the circlip 80 relative to the radial inner end portion of the first side wall 91. Besides, in this embodiment, the first side wall 91, the second side wall 90, and the bottom surface 90 are connected by smooth curved surfaces 93 and 94.

As described above, in this embodiment, in a section passing through the rotation axis Z of the shaft portion SH, a first inclination angle 81 in the first side wall 91 is defined by an inferior angle of angles sandwiched by the first side wall 91 and the inner circumference surface of the inner wheel member 12 (the tooth tip surface (tooth crest) 121b of the internal spline portion 121) to have a first apex T1 which is an inner end portion (radial inner end portion) of the shaft portion SH in the radial direction of the rotation axis Z. In the section passing through the rotation axis Z of the shaft portion SH, a second inclination angle 82 in the second side wall 92 is defined by an inferior angle of angles sandwiched by the second side wall 92 and the inner circumference surface of the inner wheel member 12 (the tooth tip surface (tooth crest) 121b of the internal spline portion 121) to have a second apex T2 which is an inner end portion (radial inner end portion) of the shaft portion SH in the radial direction of the rotation axis Z. The inner spline side annular grooves 122 and 212 have s1 shapes in which the first inclination angle 81 is greater than the second inclination angle 82.

In this way, in this embodiment, in the internal spline side annular grooves 122 and 212, the first inclination angle θ1 of the first side wall 91 side which corresponds to the pulling-out side of the first shaft S1 and the second shaft S2 is set to be greater than the second inclination angle θ2 of the second side wall 92 side. Accordingly, it is possible to more effectively suppress the first shaft S1 and the second shaft S2 from the dropout (the falling).

That is, as described above, the first inclination angle θ1 is restricted to the pulling-out load of the first shaft S1 and the second shaft S2. On the other hand, the second inclination angle θ2 is not restricted. Accordingly, the radial inner end portion (the corner portion relating to the second apex T2) of the second side wall 92 can be further apart from the circlip 80 by setting the second inclination angle 62 to be smaller value. Consequently, it is possible to more effectively suppress the damage of the second side wall 92 such as the breaking (wearing-out) of the radial inner end portion of the second side wall 92.

Third Embodiment

Figure 7:
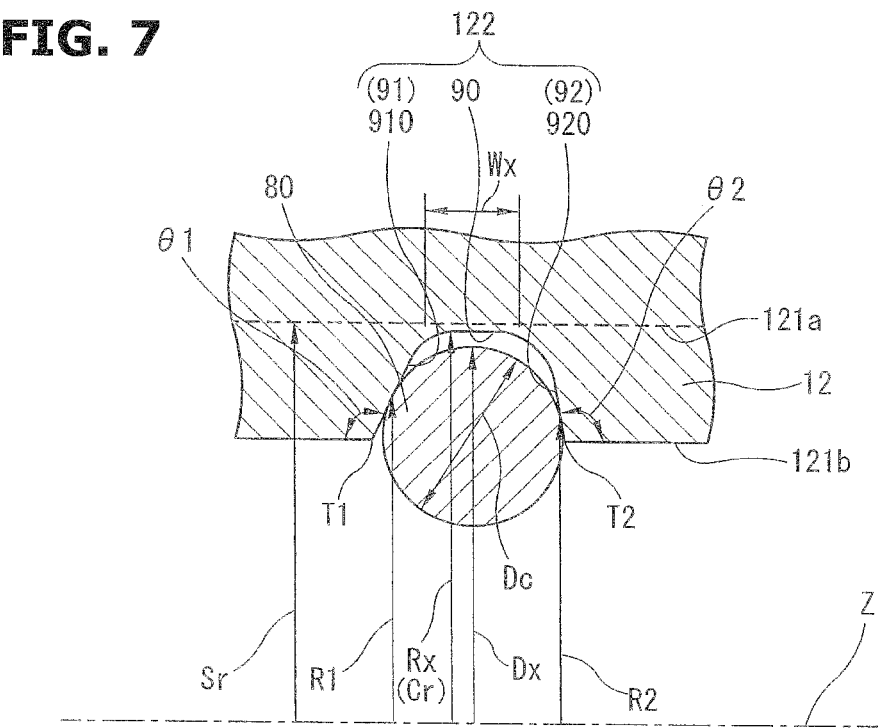
FIG. 7 is an enlarged view showing a main part of FIG. 2 in a third embodiment of the present invention.

FIG. 7 shows a propeller shaft according to a third embodiment of the present invention. In this third embodiment, the shapes of the internal spline side annular grooves 122 and 212 according to the second embodiment are varied.

FIG. 7 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 7 which is the insertion side of the first shaft S1. A second end portion side is defined by a right side of FIG. 7.

In this embodiment, in the internal spline side annular groove 122, the first inclination angle 81 is set to be smaller than the second inclination angle 82, as shown in FIG. 7, as opposed to the second embodiment. That is, the radial inner end portion of the second side wall 92 is set to be closer to the circlip 80 relative to the radial inner end portion of the first side wall 91.

As described above, in this embodiment, in a section passing through the rotation axis Z of the shaft portion SH, a first inclination angle 81 in the first side wall 91 is defined by an inferior angle of angles sandwiched by the first side wall 91 and the inner circumference surface of the inner wheel member 12 (the tooth tip surface (tooth crest) 121b of the internal spline portion 121) to have a first apex T1 which is an inner end portion (radial inner end portion) of the shaft portion SH in the radial direction of the rotation axis Z. In the section passing through the rotation axis Z of the shaft portion SH, a second inclination angle 82 in the second side wall 92 is defined by an inferior angle of angles sandwiched by the second side wall 92 and the inner circumference surface of the inner wheel member 12 (the tooth tip surface (tooth crest) 121b of the internal spline portion 121) to have a second apex T2 which is an inner end portion (radial inner end portion) of the shaft portion SH in the radial direction of the rotation axis Z. The inner spline side annular grooves 122 and 212 have shapes in which the first inclination angle 81 is smaller than the second inclination angle 82.

In this way, in this embodiment, in the internal spline side annular grooves 122 and 212, the first inclination angle θ1 of the first side wall 91 side which corresponds to the pulling-out side of the first shaft S1 and the second shaft S2 is set to be smaller than the second inclination angle θ2 of the second side wall 92 side. Accordingly, the radial inner end portion (the corner portion relating to the second apex T2) of the second side wall 92 can be closer to the circlip 80. Consequently, it is possible to decrease the axial sizes of the inner spline side annular grooves 122 and 212, and to decrease the axial sizes of the inner wheel member 12 and the small diameter portion 210, and the axial size of the propeller shaft PS.

Fourth Embodiment

Figure 8:
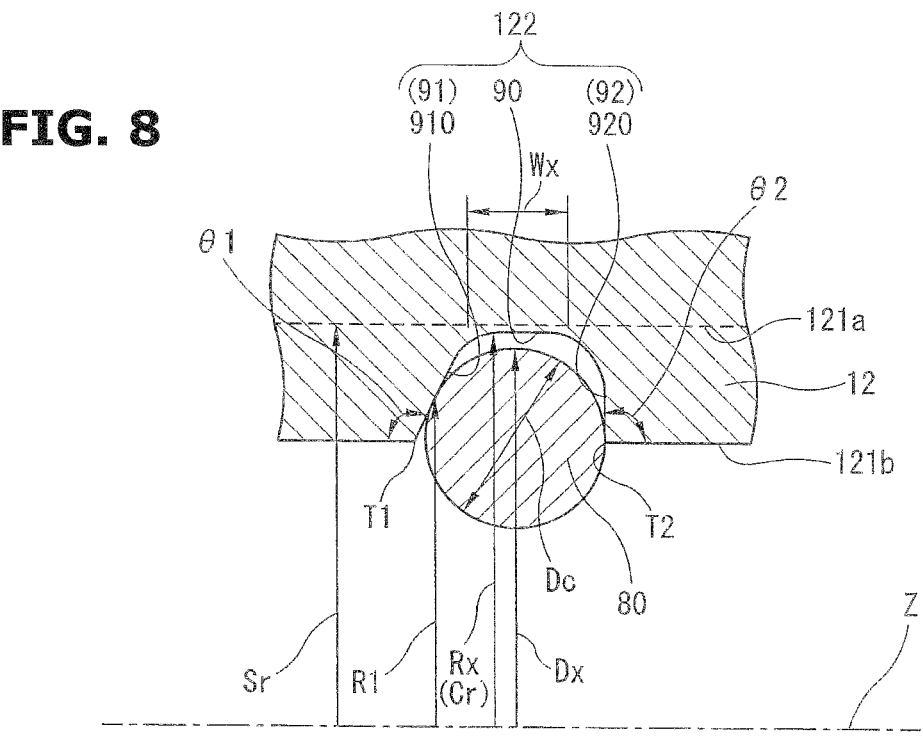
FIG. 8 is an enlarged view showing a main part of FIG. 2 in a fourth embodiment of the present invention.

FIG. 8 shows a propeller shaft according to a third embodiment of the present invention. In this fourth embodiment, the shapes of the internal spline side annular grooves 122 and 212 according to the first embodiment are varied.

FIG. 8 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 8 which is the insertion side of the first shaft S1. A second end portion side is defined by a right side of FIG. 8.

In this embodiment, in the internal spline side annular groove 122, the second inclination angle 82 is set to be a substantially right angle with respect to the bottom surface 90, as shown in FIG. 8. That is, the radial inner end portion of the second side wall 92 is set to be closer to the circlip 80 relative to the radial inner end portion of the first side wall 91. In this case, on the second end portion side, the circlip 80 is abutted on the portion of the second side wall 92 which is other than the radial inner end portion (the corner portion) of the second side wall 92. On the other hand, on the first end portion side, the circlip 80 is abutted on the first inclination surface 910. Besides, in this embodiment, the first side wall 91, the second side wall 90, and the bottom surface 90 are connected by smooth curved surfaces 93 and 94.

As described above, in this embodiment, on the first end portion side, the circlip 80 is abutted on the first inclination surface 910. On the second end portion side, the circlip 80 is abutted on the portion of the second side wall 92 which is other than the radial inner end portion (the corner portion) of the second side wall 92. Accordingly, it is possible to suppress the damage of the first side wall 91 and the second side wall 92 similarly to the first embodiment.

Fifth Embodiment

Figure 9:
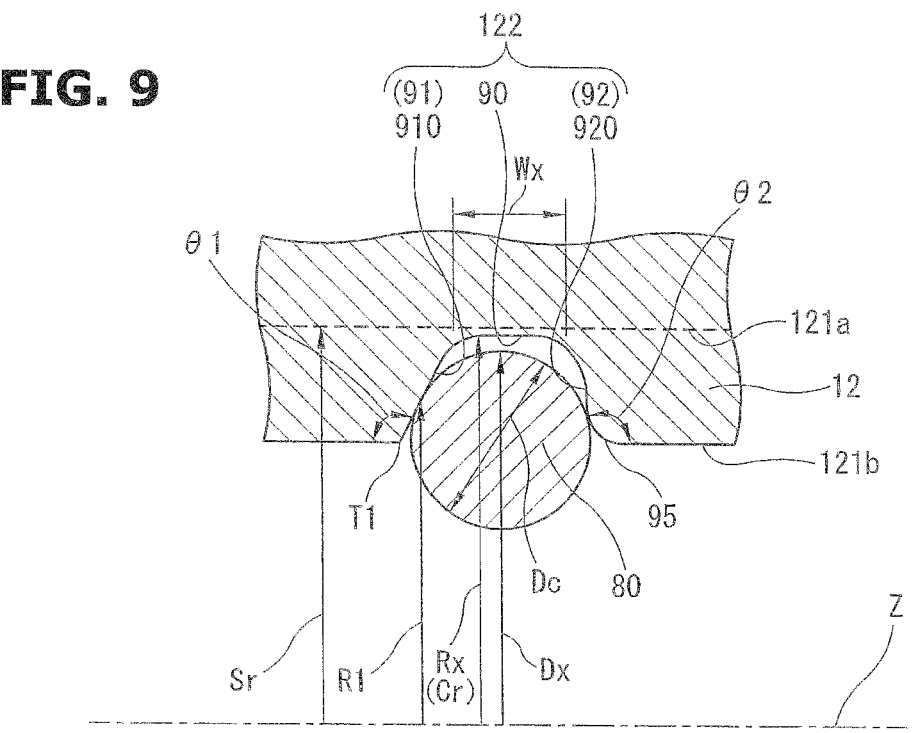
FIG. 9 is an enlarged view showing a main part of FIG. 2 in a fifth embodiment of the present invention.

FIG. 9 shows a propeller shaft according to a fifth embodiment of the present invention. In this fifth embodiment, the shapes of the internal spline side annular grooves 122 and 212 according to the fourth embodiment are varied.

FIG. 9 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 9 which is the insertion side of the first shaft S1. A second end portion side is defined by a right side of FIG. 9.

In this embodiment, the radial inner end portion of the second side wall 92 of the internal spline side annular groove 122 in the fourth embodiment is varied to a second raised arc surface 95 protruding in the axial section toward a center of the section of the circlip 80, as shown in FIG. 9. That is, the second side wall 92 and the inner circumference surface of the inner wheel member 12 (the toot tip surface 121b of the internal spline portion 121) are connected by the smooth second raised arc surface 95. With this, the circlip 80 is abutted on the second raised arc surface 95 on the second end portion side.

As described above, in this embodiment, the second side wall 92 includes the second raised arc surface 95 which is provided at an inner end portion of the second side wall 92 in the radial direction of the rotation axis Z of the shaft portion SH, and which protrudes in a section passing through the rotation axis Z of the shaft portion SH, toward the center of the section of the circlip 80. The circlip 80 is abutted on the second raised arc surface 95.

In the configuration according to the fourth embodiment, the radial inner end portion of the second side wall 92 of the internal spline side annular grooves 122 and 212 is the corner portion. Accordingly, the circlip 80 may be abutted on the corner portion due to the manufacturing error.

In this embodiment, the radial inner end portion of the second side wall 92 of the internal spline side annular grooves 122 and 212 is the second raised arc surface 95. The corner portion is not formed at the radial inner end portion of the second side wall 92. With this, it is possible to increase the abutment area with the circlip 80, and to further decrease the contact stress (the surface pressure) of the second side wall 92. Accordingly, it is possible to suppress the damage of the second side wall 92 by the contact of the circlip 80 against the corner portion.

Sixth Embodiment

Figure 10:
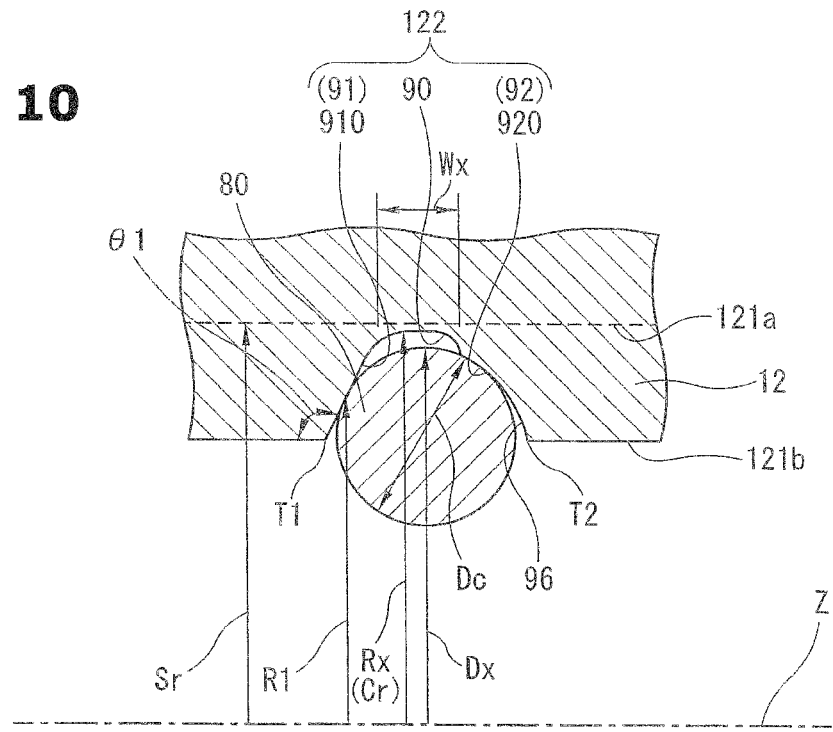
FIG. 10 is an enlarged view showing a main part of FIG. 2 in a sixth embodiment of the present invention.

FIG. 10 shows a propeller shaft according to a sixth embodiment of the present invention. In this sixth embodiment, the shapes of the internal spline side annular grooves 122 and 212 according to the fifth embodiment are varied.

FIG. 10 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 10 which is the insertion side of the first shaft S1. A second end portion side is defined by a right side of FIG. 10.

In this embodiment, the radial inner end portion of the second side wall 92 of the internal spline side annular groove 122 in the fifth embodiment is a second recessed arc surface 96 which is recessed in the axial section toward a direction opposite to the direction toward the center of the section of the circlip 80, as shown in FIG. 10. That is, the second side wall 90, and the inner circumference surface of the inner wheel member 12 (the tooth tip surface 121b of the internal spline portion 121) are connected by the smooth second recessed arc surface 95. The circlip 80 is abutted on the second recessed surface 96.

As described above, in this embodiment, the second side wall 92 includes the second recessed arc surface 96 which is provided at an inner end portion of the second side wall 92 in the radial direction of the rotation axis Z of the shaft portion SH, and which is recessed in a section passing through the rotation axis Z of the shaft portion SH, in the direction opposite to the direction toward the center of the section of the circlip 80. The circlip 80 is abutted on the second recessed arc surface 96.

Accordingly, the corner portion is not formed at the radial inner end portion of the second side wall 92. It is possible to suppress the damage of the second side wall 92.

Furthermore, in this embodiment, the circlip 80 is abutted on the second recessed arc surface 96. Accordingly, it is possible to further increase the abutment area with the circlip 80, relative to the second raised arc surface 95 in the fifth embodiment. With this, it is possible to further decrease the contact stress (the surface pressure) of the second side wall 92.

Seventh Embodiment

Figure 11:
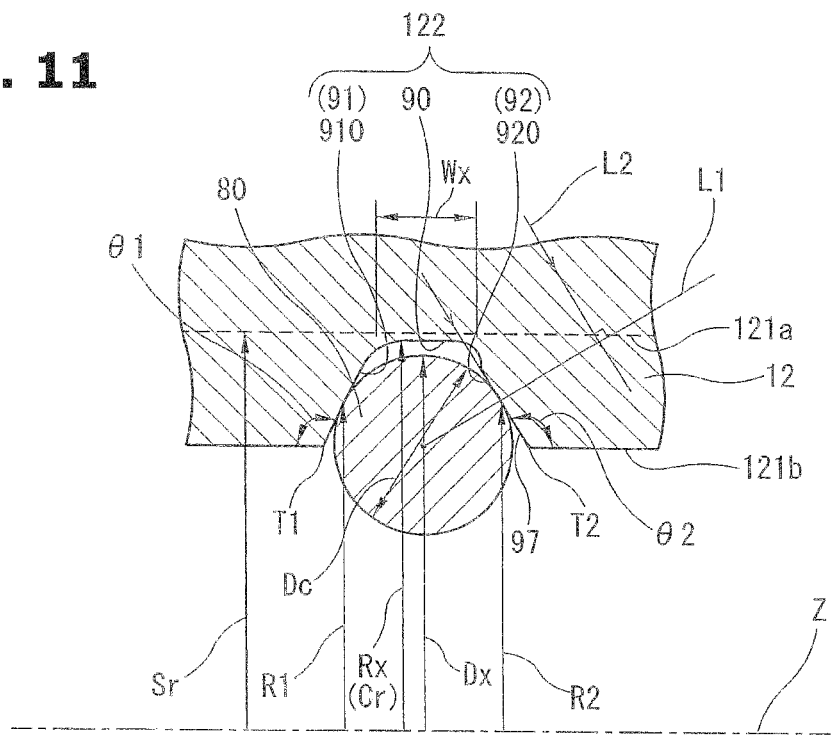
FIG. 11 is an enlarged view showing a main part of FIG. 2 in a seventh embodiment of the present invention.

FIG. 11 shows a propeller shaft according to a seventh embodiment of the present invention. In this seventh embodiment, the shapes of the internal spline side annular grooves 122 and 212 according to the fifth embodiment are varied.

FIG. 11 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 11 which is the insertion side of the first shaft S1. A second end portion side is defined by a right side of FIG. 11.

In this embodiment, the second raised arc surface 95 according to the fifth embodiment is omitted, as shown in FIG. 11. A second chamfering portion 97 is formed at the radial inner end portion of the second side wall 92 of the internal spline side annular groove 122. The second chamfering portion 97 has a conical tapered shape inclined with respect to the rotation axis Z so that the radius R2 of the second side wall 92 which is the shortest distance from the rotation axis Z is gradually decreased from the first end portion side toward the second end portion side. Moreover, this second chamfering portion 97 is formed in parallel with a line L2 perpendicular to a line L1 extending in the axial section from the second chamfering portion 97 toward the center of the section of the circlip 80. With this, the circlip 80 is abutted on the second chamfering portion 97 on the second end portion side.

As described above, in this embodiment, the second side wall 92 includes the second chamfering portion 97. The second chamfering portion 97 is provided at the inner end portion of the second side wall 92 in the radial direction of the rotation axis Z. The second chamfering portion 97 is formed in parallel with the line L2 perpendicular to the line L1 extending from the second chamfering portion 97 toward the center of the section of the circlip 80 in the section passing through the rotation axis Z of the shaft portion SH. The circlip 80 is abutted on the second chamfering portion 97.

In this way, in this embodiment, it is possible to further increase the abutment area with the circlip 80, relative to the second raised arc surface 95 in the fifth s15 embodiment. With this, it is possible to further decrease the contact stress (the surface pressure) of the second side wall 92.

Eighth Embodiment

Figure 12:
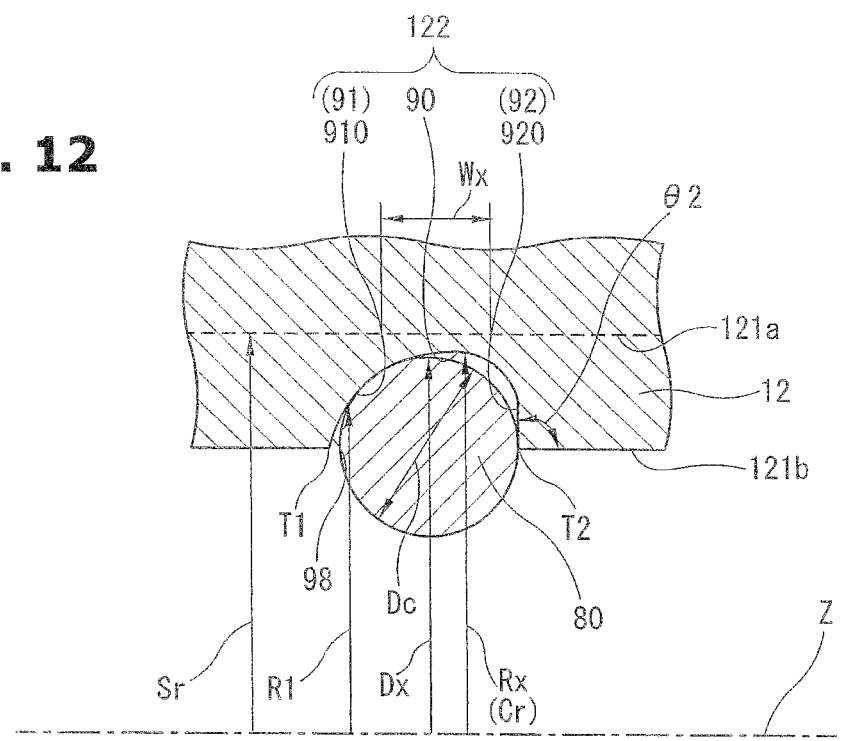
FIG. 12 is an enlarged view showing a main part of FIG. 2 in an eighth embodiment of the present invention.

FIG. 12 shows a propeller shaft according to an eighth embodiment of the present invention. In this eighth embodiment, the shapes of the internal spline side annular grooves 122 and 212 according to the fourth embodiment are varied.

FIG. 12 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 12 which is the insertion side of the first shaft S1. A second end portion side is defined by a right side of FIG. 12.

In this embodiment, the first inclination surface 910 in the fourth embodiment is not formed into the flat shape. The first inclination surface 910 is formed into a curved shape, as shown in FIG. 12. That is, the first side wall 91 is constituted by a first recessed arc surface 98 recessed in the axial section in the direction opposite to the direction toward the center of the section of the circlip 80. With this, the circlip 80 is abutted on the first recessed arc surface 98 on the first end portion side.

As described above, in this embodiment, the first is side wall 91 includes the first recessed arc surface 98 which is provided at the inner end portion of the first side wall 91 in the radial direction of the rotation axis Z of the shaft portion SH, and which is recessed in a direction opposite to the direction toward the center of the section of the circlip 80 in the section passing through the rotation axis Z of the shaft portion SH.

In this way, in this embodiment, it is possible to further increase the abutment area with the circlip 80, relative to the first inclination surface 910 in the fourth embodiment. With this, it is possible to further decrease the contact stress (the surface pressure) of the first side wall 91.

Ninth Embodiment

Figure 13:
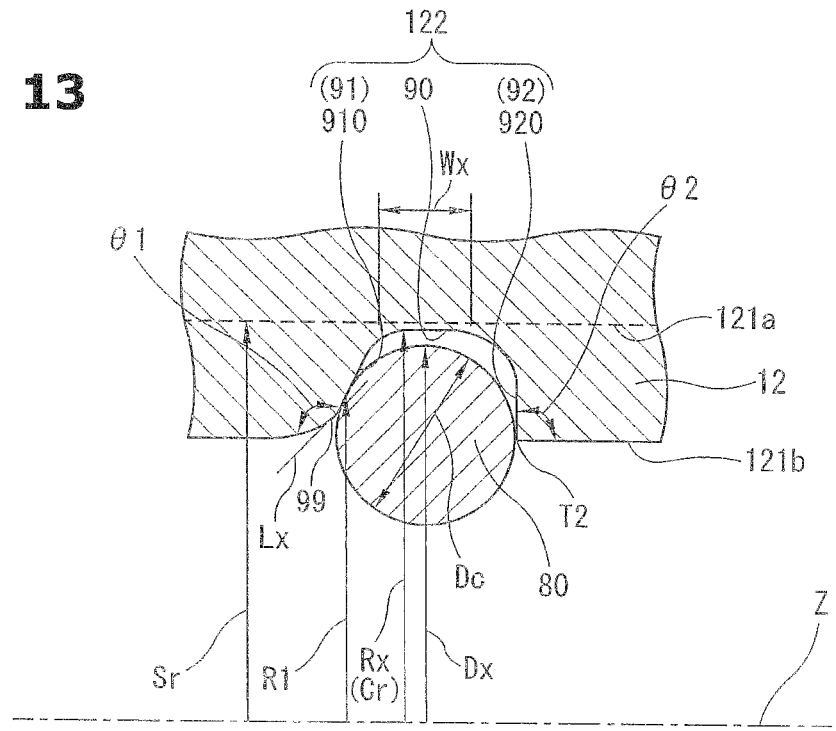
FIG. 13 is an enlarged view showing a main part of FIG. 2 in a ninth embodiment of the present invention.

FIG. 13 shows a propeller shaft according to a ninth embodiment of the present invention. In this ninth embodiment, the shapes of the internal spline side annular grooves 122 and 212 according to the fourth embodiment are varied.

FIG. 13 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 13 which is the insertion side of the first shaft S1. A second end portion side is defined by a right side of FIG. 13.

As shown in FIG. 13, in this embodiment, the radial inner end portion of the first side wall 91 of the inner spline side annular groove 122 according to the fourth embodiment is constituted as a first raised arc surface 99 protruding toward the center of the section of the circlip 80 in the axial section. That is, the first side wall 91 and the inner circumference surface (the tooth tip surface 121b of the internal spline portion 121) of the inner wheel member 12 are connected by the smooth first raised arc surface 99. With this, the circlip 80 is abutted on the first raised arc surface 99 on the first end portion side.

As described above, in the embodiment, the first side wall 91 includes a first raised arc surface 99 includes the first raised arc surface 99 which is provided at the inner end portion of the first side wall 91 in the radial direction of the rotation axis Z of the shaft portion SH, and which protrudes in the section passing through the rotation axis Z of the shaft portion SH, toward the center of the section of the circlip 80. The circlip 80 is abutted on the first raised arc surface 99.

In the configuration according to the fourth embodiment, the radial inner end portion of the first side wall 91 of the internal spline side annular grooves 122 and 212 is the corner portion. Accordingly, the circlip 80 may be abutted on the corner portion due to the manufacturing error.

In this embodiment, therefore, the radial inner end portion of the first side wall of the internal spline side annular grooves 122 and 212 is constituted as the first raised arc surface 99. The corner portion is not formed at the radial inner end portion of the first side wall 91. With this, it is possible to further increase the abutment area with the circlip 80, and to further decrease the contact stress (the surface pressure) of the first side wall 91. Consequently, it is possible to suppress the damage of the first side wall 91 generated due to the abutment of the circlip 80 against the corner portion.

Moreover, in the first raised arc surface 99, the predetermined pulling-out load with respect to the first shaft S1 is maintained from the second end portion side to the intermediate portion of the first raised arc surface 99 by the predetermined inclination or more of the tangent line Lx of the first raised arc surface 99. On the other hand, in a case where the force which is equal to or greater than the predetermined pulling-out load is acted, that is, in a case where the first shaft S1 is detached at the repair service and so on, the detachment of the first shaft S1 is easy since the inclination of the tangent line Lx of the first raised arc surface 99 is gentle on the first end portion side of the intermediate portion of the first raised arc surface 99. In this way, it is possible to maintain the appropriate holding characteristics of the first shaft S1 by the first raised arc surface 99, and to improve the maintainability.

Tenth Embodiment

Figure 14:
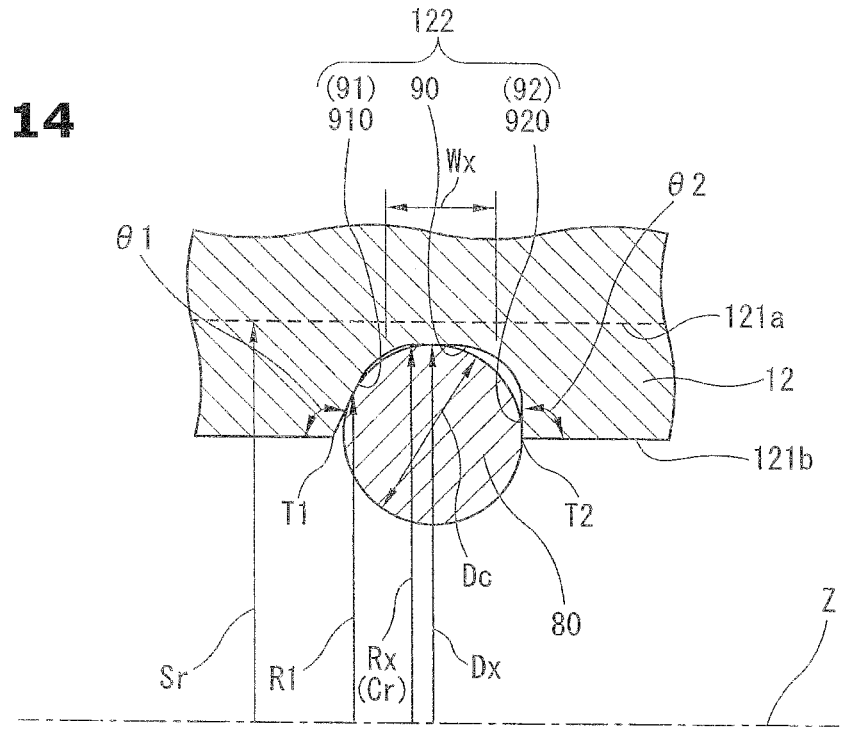
FIG. 14 is an enlarged view showing a main part of FIG. 2 in a tenth embodiment of the present invention.

FIG. 14 shows a propeller shaft according to a tenth embodiment of the present invention. In this tenth embodiment, the shapes of the internal spline side annular grooves 122 and 212 according to the fourth embodiment are varied.

FIG. 14 is an enlarged view showing a main part of FIG. 1 by enlarging a portion near the internal spline side annular groove 122 of the first constant velocity joint 1. Besides, in this embodiment, the only internal spline side annular groove 122 of the first constant velocity joint 1 is explained. The explanations of the internal spline side annular groove 212 of the second constant velocity joint 1 are omitted. Moreover, in the explanations in this drawing, a first end portion side is defined by a left side of FIG. 14 which is the insertion side of the first shaft S1. A second end portion side is defined by a right side of FIG. 14.

As shown in FIG. 14, in this embodiment, the inside diameter Rx of the bottom surface 90 of the internal spline side annular groove 122 according to the fourth embodiment is set to be equal to or smaller than the outside diameter Dx of the circlip 80. With this, the circlip 80 is constantly abutted on three points of the first side wall 91, the second side wall 92, and the bottom surface 90.

In this way, in this embodiment, the circlip 80 is abutted on the bottom surface 90.

In this way, in the internal spline side annular grooves 122 and 212, the circlip 80 is abutted on the bottom surface 90. With this, it is possible to increase the abutment area between the internal spline side annular grooves 122 and 212 and the circlip 80. Consequently, it is possible to further decrease the contact stress (the surface pressure) of the abutment surfaces of the circlip 80.

The present invention is not limited to the configurations and the aspects which are described in the embodiments. The present invention can be freely variable in accordance with the specification and the cost of the applied object as long as they can attain the operations and the effects of the present invention.

For example, below-described aspects are conceivable as power transmission shafts based on the above-described embodiments, and so on.

That is, in one aspect, the power transmission shaft provided between a first shaft provided on a driving source side of a vehicle, and a second shaft provided on a driven wheel side, the power transmission shaft includes: a shaft portion provided between the first shaft and the second shaft; and a bearing including a cylindrical portion, an internal spline portion, and an internal spline side annular groove, the cylindrical portion which is provided to the shaft portion, and which includes a first end portion and a second end portion that are both end portions in a direction of a rotation axis of the shaft portion, the internal spline portion which is formed on an inner circumference side of the cylindrical portion, and which is arranged to be engaged with an external spline portion formed on an outer circumference side of one of the first shaft and the second shaft by inserting the one of the first shaft and the second shaft into the cylindrical portion from the first end portion side of the cylindrical portion toward the second end portion side of the cylindrical portion, the internal spline side annular groove which is formed on the inner circumference side of the cylindrical portion, which holds a circlip provided in an external spline side annular groove formed on the outer circumference side of one of the first shaft and the second shaft to restrict movement of the one of the first shaft and the second shaft with respect to the cylindrical portion in the direction of the rotation axis of the shaft portion, and which includes a bottom surface, and a first side wall and a second side wall which are a pair of side walls provided on both sides in the direction of the rotation axis of the shaft portion in a section passing through the rotation axis of the shaft portion, the first side wall which is provided on the first end portion side of the bottom surface, which includes a first inclination surface inclined with respect to the rotation axis of the shaft portion so that a radius of the first side wall which is a shortest distance from the rotation axis of the shaft portion is gradually increased from the first end portion side toward the second end portion side, and on which the circlip is abutted in a state where a radius of the circlip is decreased within the internal spline side annular groove, and the second side wall which is provided on the second end portion side of the bottom surface, and on which the circlip is abutted in the state where the radius of the circlip is decreased within the internal spline side annular groove.

In the power transmission shaft according to the preferable aspect, the circlip is abutted on the first inclination surface.

In another preferable aspect, in one of the aspects of the power transmission shafts, the circlip is abutted on a portion of the second side wall which is other than an inner end portion of the second side wall in a radial direction of the rotation axis of the shaft portion.

In still another preferable aspect, in one of the aspects of the power transmission shafts, the second side wall includes a second raised arc surface which is provided at an inner end portion of the second side wall in a radial direction of the rotation axis of the shaft portion, and which protrudes toward a center of a section of the circlip in the section passing through the rotation axis of the shaft portion; and the circlip is abutted on the second raised arc surface.

In still another preferable aspect, in one of the aspects of the power transmission shafts, the second side wall includes a second recessed arc surface which is provided at an inner end portion of the second side wall in a radial direction of the rotation axis of the shaft portion, and which is recessed in a direction opposite to a direction toward a center of a section of the circlip in the section passing through the rotation axis of the shaft portion; and the circlip is abutted on the second recessed arc surface.

In still another preferable aspect, in one of the aspects of the power transmission shafts, the second side wall includes a second chamfering portion; the second chamfering portion is provided at an inner end portion of the second side wall in a radial direction of the rotation axis of the shaft portion; the second chamfering portion is formed in parallel with a line perpendicular to a line extending from the second chamfering portion to a center of a section of the circlip in the section passing through the rotation axis of the shaft portion; and the circlip is abutted on the second chamfering portion.

In still another preferable aspect, in one of the aspects of the power transmission shafts, the second side wall includes a second inclination surface inclined with respect to the rotation axis of the shaft portion so that a radius of the second side wall which is a shortest distance from the rotation axis of the shaft portion is gradually decreased from the first end portion side toward the second end portion side; and the circlip is abutted on the second inclination surface.

In still another preferable aspect, in one of the aspects of the power transmission shafts, a first inclination angle is an inferior angle of angles sandwiched by the first side wall and an inner circumference surface of the cylindrical portion to have a first apex which is an inner end portion of the first side wall in a radial direction of the rotation axis of the shaft portion, in the section passing through the rotation axis of the shaft portion; a second inclination angle is an inferior angle of angles sandwiched by the second side wall and the inner circumference surface of the cylindrical portion to have a second apex which is an inner end portion of the second side wall in the radial direction of the rotation axis of the shaft portion, in the section passing through the rotation axis of the shaft portion; and the internal spline side annular groove has the first inclination angle greater than the second inclination angle.

In still another preferable aspect, in one of the aspects of the power transmission shafts, a first inclination angle is an inferior angle of angles sandwiched by the first side wall and an inner circumference surface of the cylindrical portion to have a first apex which is an inner end portion of the first side wall in a radial direction of the rotation axis of the shaft portion, in the section passing through the rotation axis of the shaft portion; a second inclination angle is an inferior angle of angles sandwiched by the second side wall and the inner circumference surface of the cylindrical portion to have a second apex which is an inner end portion of the second side wall in the radial direction of the rotation axis of the shaft portion, in the section passing through the rotation axis of the shaft portion; and the internal spline side annular groove has the first inclination angle smaller than the second inclination angle.

In still another preferable aspect, in one of the aspects of the power transmission shafts, the circlip is abutted on the bottom surface.

In still another preferable aspect, in one of the aspects of the power transmission shafts, the circlip is not abutted on the bottom surface.

In still another preferable aspect, in one of the aspects of the power transmission shafts, the first side wall includes a first recessed arc surface which is provided at an inner end portion of the first side wall in a radial direction of the rotation axis of the shaft portion, and which is recessed in a direction opposite to a direction toward a center of a section of the circlip in the section passing through the rotation axis of the shaft portion; and the circlip is abutted on the first recessed arc surface.

In still another preferable aspect, in one of the aspects of the power transmission shafts, the first side wall includes a first raised arc surface which is provided at an inner end portion of the first side wall in a radial direction of the rotation axis of the shaft portion, and which protrudes in a direction toward a center of a section of the circlip in the section passing through the rotation axis of the shaft portion; and the circlip is abutted on the first raised arc surface.

In still another preferable aspect, in one of the aspects of the power transmission shafts, an annular groove bottom surface radius is a shortest distance between the bottom surface and the rotation axis of the shaft portion; a spline tooth bottom surface radius is a shortest distance between a tooth bottom surface of the internal spline portion, and the rotation axis of the shaft portion; and the internal spline side annular groove has the annular groove bottom surface radius smaller than the spline tooth bottom surface radius.

The invention claimed is:
1. A power transmission shaft provided between a first shaft provided on a driving source side of a vehicle, and a second shaft provided on a driven wheel side, the power transmission shaft comprising:
- a shaft portion provided between the first shaft and the second shaft; and
- a bearing including a cylindrical portion, an internal spline portion, and an internal spline side annular groove,
  - the cylindrical portion being provided to the shaft portion, and including a first end portion and a second end portion that are both end portions in a direction of a rotation axis of the shaft portion,
  - the internal spline portion being formed on an inner circumference side of the cylindrical portion, and arranged to be engaged with an external spline portion formed on an outer circumference side of one of the first shaft and the second shaft by inserting the one of the first shaft and the second shaft into the cylindrical portion from the first end portion side of the cylindrical portion toward the second end portion side of the cylindrical portion,
  - the internal spline side annular groove being formed on the inner circumference side of the cylindrical portion, and configured to hold a circlip provided in an external spline side annular groove formed on the outer circumference side of one of the first shaft and the second shaft to restrict movement of the one of the first shaft and the second shaft with respect to the cylindrical portion in the direction of the rotation axis of the shaft portion, and including a bottom surface, and a first side wall and a second side wall which are a pair of side walls provided on both sides in the direction of the rotation axis of the shaft portion in a section passing through the rotation axis of the shaft portion,
  - the first side wall being provided on the first end portion side of the bottom surface, and including a first inclination surface inclined with respect to the rotation axis of the shaft portion so that a radius of the first side wall which is a shortest distance from the rotation axis of the shaft portion is gradually increased from the first end portion side toward the second end portion side, and on which the circlip is abutted in a state where a radius of the circlip is decreased within the internal spline side annular groove, and
  - the second side wall being provided on the second end portion side of the bottom surface, and on which the circlip is abutted in the state where the radius of the circlip is decreased within the internal spline side annular groove,
  - wherein an annular groove bottom surface radius is a shortest distance between the bottom surface and the rotation axis of the shaft portion; a spline tooth bottom surface radius is a shortest distance between a tooth bottom surface of the internal spline portion, and the rotation axis of the shaft portion; and the internal spline side annular groove has the annular groove bottom surface radius smaller than the spline tooth bottom surface radius, and
  - wherein the circlip is not abutted on the bottom surface provided radially outside the abutment portion between the circlip and the first side wall, and the abutment portion between the circlip and the second side wall.

2. The power transmission shaft as claimed in claim 1, wherein the circlip is abutted on the first inclination surface.

3. The power transmission shaft as claimed in claim 2, wherein the circlip is abutted on a portion of the second side wall which is other than an inner end portion of the second side wall in a radial direction of the rotation axis of the shaft portion.

4. The power transmission shaft as claimed in claim 1, wherein the second side wall includes a second raised arc surface which is provided at an inner end portion of the second side wall in a radial direction of the rotation axis of the shaft portion, and which protrudes toward a center of a section of the circlip in the section passing through the rotation axis of the shaft portion; and the circlip is abutted on the second raised arc surface.

5. The power transmission shaft as claimed in claim 1, wherein the second side wall includes a second recessed arc surface which is provided at an inner end portion of the second side wall in a radial direction of the rotation axis of the shaft portion, and which is recessed in a direction opposite to a direction toward a center of a section of the circlip in the section passing through the rotation axis of the shaft portion; and the circlip is abutted on the second recessed arc surface.

6. The power transmission shaft as claimed in claim 1, wherein the second side wall includes a second chamfering portion; the second chamfering portion is provided at an inner end portion of the second side wall in a radial direction of the rotation axis of the shaft portion; the second chamfering portion is formed in parallel with a line perpendicular to a line extending from the second chamfering portion to a center of a section of the circlip in the section passing through the rotation axis of the shaft portion; and the circlip is abutted on the second chamfering portion.

7. The power transmission shaft as claimed in claim 1, wherein the second side wall includes a second inclination surface inclined with respect to the rotation axis of the shaft portion so that a radius of the second side wall which is a shortest distance from the rotation axis of the shaft portion is gradually decreased from the first end portion side toward the second end portion side; and the circlip is abutted on the second inclination surface.

8. The power transmission shaft as claimed in claim 7, wherein a first inclination angle is an inferior angle of angles sandwiched by the first side wall and an inner circumference surface of the cylindrical portion to have a first apex which is an inner end portion of the first side wall in a radial direction of the rotation axis of the shaft portion, in the section passing through the rotation axis of the shaft portion; a second inclination angle is an inferior angle of angles sandwiched by the second side wall and the inner circumference surface of the cylindrical portion to have a second apex which is an inner end portion of the second side wall in the radial direction of the rotation axis of the shaft portion, in the section passing through the rotation axis of the shaft portion; and the internal spline side annular groove has the first inclination angle greater than the second inclination angle.

9. The power transmission shaft as claimed in claim 7, wherein a first inclination angle is an inferior angle of angles sandwiched by the first side wall and an inner circumference surface of the cylindrical portion to have a first apex which is an inner end portion of the first side wall in a radial direction of the rotation axis of the shaft portion, in the section passing through the rotation axis of the shaft portion; a second inclination angle is an inferior angle of angles sandwiched by the second side wall and the inner circumference surface of the cylindrical portion to have a second apex which is an inner end portion of the second side wall in the radial direction of the rotation axis of the shaft portion, in the section passing through the rotation axis of the shaft portion; and the internal spline side annular groove has the first inclination angle smaller than the second inclination angle.

10. The power transmission shaft as claimed in claim 1, wherein the first side wall includes a first recessed arc surface which is provided at an inner end portion of the first side wall in a radial direction of the rotation axis of the shaft portion, and which is recessed in a direction opposite to a direction toward a center of a section of the circlip in the section passing through the rotation axis of the shaft portion; and the circlip is abutted on the first recessed arc surface.

11. The power transmission shaft as claimed in claim 1, wherein the first side wall includes a first raised arc surface which is provided at an inner end portion of the first side wall in a radial direction of the rotation axis of the shaft portion, and which protrudes in a direction toward a center of a section of the circlip in the section passing through the rotation axis of the shaft portion; and the circlip is abutted on the first raised arc surface.

\* \* \* \* \*